(12) United States Patent
Rhoden (10) Patent No.: US 10,029,191 B2
(45) Date of Patent: Jul. 24, 2018

(54) LIQUID-DISSOLVED GAS SEPARATORS

(71) Applicant: Hamilton Sundstrand Corporation, Charlotte, NC (US)

(72) Inventor: William E. Rhoden, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 71 days.

(21) Appl. No.: 15/266,645

(22) Filed: Sep. 15, 2016

(65) Prior Publication Data

US 2018/0071659 A1   Mar. 15, 2018

(51) Int. Cl.
| B01D 19/00 | (2006.01) |
| B01D 67/00 | (2006.01) |
| B01D 71/02 | (2006.01) |
| F02C 7/22 | (2006.01) |
| B64D 37/34 | (2006.01) |

(52) U.S. Cl.
CPC ..... B01D 19/0031 (2013.01); B01D 67/0041 (2013.01); B01D 71/022 (2013.01); F02C 7/22 (2013.01); B64D 37/34 (2013.01); F05D 2220/32 (2013.01)

(58) Field of Classification Search
CPC ........... B01D 19/0031; B01D 67/0041; B01D 71/022; B01D 2257/104; B01D 2325/02; B01D 2325/20; F02C 7/22; B64D 37/32; B64D 37/34; F05D 2220/32
See application file for complete search history.

(56) References Cited

U.S. PATENT DOCUMENTS

| 3,523,408 | A | * | 8/1970 | Rosenberg ......... | B01D 19/0031 128/205.12 |
| 4,177,149 | A | * | 12/1979 | Rosenberg ......... | B01D 19/0031 210/436 |
| 4,256,470 | A | * | 3/1981 | Zajicek .............. | B01D 19/0031 210/323.2 |
| 4,853,013 | A | * | 8/1989 | Rio .................... | B01D 19/0031 220/373 |
| 5,218,832 | A | * | 6/1993 | Woolley ............. | B01D 19/0031 62/470 |
| 6,086,729 | A | | 7/2000 | Bredesen et al. | |
| 6,315,815 | B1 | | 11/2001 | Spadaccini et al. | |
| 6,666,967 | B1 | * | 12/2003 | Oyabu ............... | B01D 19/0031 210/218 |
| 8,177,884 | B2 | | 5/2012 | Schmidt et al. | |
| 8,741,029 | B2 | | 6/2014 | Cordatos et al. | |
| 9,120,580 | B2 | | 9/2015 | Sampath | |

(Continued)

FOREIGN PATENT DOCUMENTS

JP   2001 286702   10/2001

OTHER PUBLICATIONS

Intellectual Property Office (IPO) Search Report dated Jan. 13, 2018 for Application No. GB1714377.7.

*Primary Examiner* — Jason M Greene
(74) *Attorney, Agent, or Firm* — Locke Lord LLP; Scott D. Wofsy; Christopher J. Cillië

(57) ABSTRACT

A liquid-dissolved gas separator includes a metallic separator. The separator has a plurality of open pores that connect a liquid-facing surface of the separator with an opposed vacuum-facing surface of the separator for separating dissolved gases from a liquid traversing the liquid-facing surface of the separator body.

19 Claims, 6 Drawing Sheets

(56) References Cited

U.S. PATENT DOCUMENTS

| | | | |
|---|---|---|---|
| 2004/0137209 A1* | 7/2004 | Zeller | B01D 67/0041 428/304.4 |
| 2006/0127711 A1* | 6/2006 | Kaschmitter | H01M 8/04186 429/413 |
| 2007/0119774 A1* | 5/2007 | Yen | B01D 19/0031 210/500.1 |
| 2007/0131604 A1* | 6/2007 | Nomura | B01D 29/23 210/321.69 |
| 2009/0145461 A1* | 6/2009 | Rastogi | B01D 19/0031 134/18 |
| 2010/0294128 A1* | 11/2010 | Schmidt | B01D 19/0031 95/46 |
| 2013/0074798 A1 | 3/2013 | Shaffer | |
| 2013/0242006 A1* | 9/2013 | Anno | B01D 19/0031 347/85 |
| 2015/0041380 A1* | 2/2015 | Lin | B01D 19/0031 210/188 |
| 2016/0051941 A1 | 2/2016 | Li et al. | |

\* cited by examiner

LIQUID-DISSOLVED GAS SEPARATORS

BACKGROUND OF THE INVENTION

1. Field of the Invention

The present disclosure relates to fuel systems, and more particularly for gas turbine engine fuel systems which route fuel through or in proximity to hot engine components.

2. Description of Related Art

Because of its relative abundance in the air of the atmosphere, relatively large quantities of oxygen, as well as nitrogen and other gases, readily dissolve into various liquid media. The presence of dissolved oxygen, in particular, in some liquids, such as hydrocarbon fuels for example, may support oxidation reactions that yield undesirable by-products.

For instance, aircraft may employ fuel as coolant for various systems in the aircraft. When air-saturated fuel is heated, such as when traversing a hot engine components prior reaching the engine combustors, oxygen dissolved in the fuel can form coke precursor compounds. Such coking occurs most readily in the portions of the fuel system having high temperatures and/or constricted flow paths. The coke precursors form coke or varnish depositions within internal fuel system structures, such as injectors, which may reduce the reliability of the fuel system. Since such depositions can affect the reliability of the fuel system, some fuel systems employ deoxygenation structures for removing dissolved gases from fuel, such as Teflon or similar materials. Such structures are typically provisioned to reduce the attendant risks due to leakage, rupture, and/or over-pressurization, and may be hardened to withstand the increasingly high fuel temperatures employed in gas turbine engines.

Such conventional methods and systems have generally been considered satisfactory for their intended purpose. However, there is still a need in the art for improved deoxygenation devices. The present disclosure provides a solution for this need.

SUMMARY OF THE INVENTION

A liquid-dissolved gas separator includes a housing with a metallic separator mounted within the housing. The metallic separator has a plurality of open pores that connect a liquid-facing surface and an opposed vacuum-facing surface of the metallic separator. The open pores are sized to allow dissolved gases in liquid traversing the liquid-facing surface of the separator to pass through the open pores. The open pores are also sized to prevent the liquid from passing through the open pores.

In certain embodiments, the separator can include interfused metallic particles. The interfused metallic particles can bound both the liquid-facing surface and the vacuum-facing surface of the separator. The liquid-facing surface can be a planar surface. The vacuum-facing surface can be a planar surface. The separator can include one or more of a nickel-based alloy, steel, titanium, aluminum, or an alloy thereof. The separator can have porosity that is between about 0.1 and about 0.3.

In accordance with certain embodiments, the open pores can be surface-connected with both the liquid-facing and the vacuum-facing surfaces of the separator. The open pores can have respective critical dimensions that are smaller than about 250 picometers (about 1.2 e-8 inches). The open pores can have respective critical dimensions that are greater than about 150 picometers (about 0.6 e-8 inches).

It is contemplated that the separator can have a first lateral edge and an opposed second lateral edge. The open pores can be uniformly distributed between the first and second lateral edges of the separator. The separator can have a first longitudinal edge and an opposed second lateral edge. The open pores can be uniformly distributed between the first and second longitudinal edges of the separator. A frame can be disposed about the periphery of the separator. The frame can be integral with the separator. The frame and the separator can be formed from a common metallic material.

It is also contemplated that, in accordance with certain embodiments, a vacuum source can be in fluid communication with the fuel-facing surface of the separator through the open pores. A liquid source can be in fluid communication with the vacuum-facing surface through the open pores. A liquid destination can be in fluid communication with the vacuum-facing surface through the open pores. A housing can envelope the separator. The separator can divide an interior of the housing into liquid and gas chambers.

A fuel system includes a fuel source, a fuel destination, and a fuel de-oxygenator. The fuel de-oxygenator includes a housing with a separator as described above seated within the housing interior. The separator divides the housing into a liquid chamber and a gas chamber, a vacuum source in fluid communication with the fuel-facing surface of the separator through the open pores, a fuel source in fluid communication with the vacuum-facing surface through the open pores, and a fuel destination in fluid communication with the vacuum-facing surface through the open pores. The open pores have respective critical dimensions between about 150 picometers (about 0.6 e-8 inches) and about 250 picometers (about 1.2 e-8 inches) to separate dissolved oxygen from fuel flowing between the fuel source and the fuel destination as the fuel traverses the liquid-facing surface of the separator.

A method of making a separator for a liquid-dissolved gas separator includes fusing metallic particulate to define a separator liquid-facing surface and fusing particulate to define a separator vacuum-facing surface. The method includes connecting the liquid-facing surface with the vacuum-facing surface with the open pores and dimensioning the open pores with respective critical dimensions to selectively allow dissolved gas to pass through the open pores and prevent liquid from passing through the open pores of the separator. It is contemplated that dimensioning the pores can include the use of an additive manufacturing technique or a subsequent process, such as hot isostatic pressing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
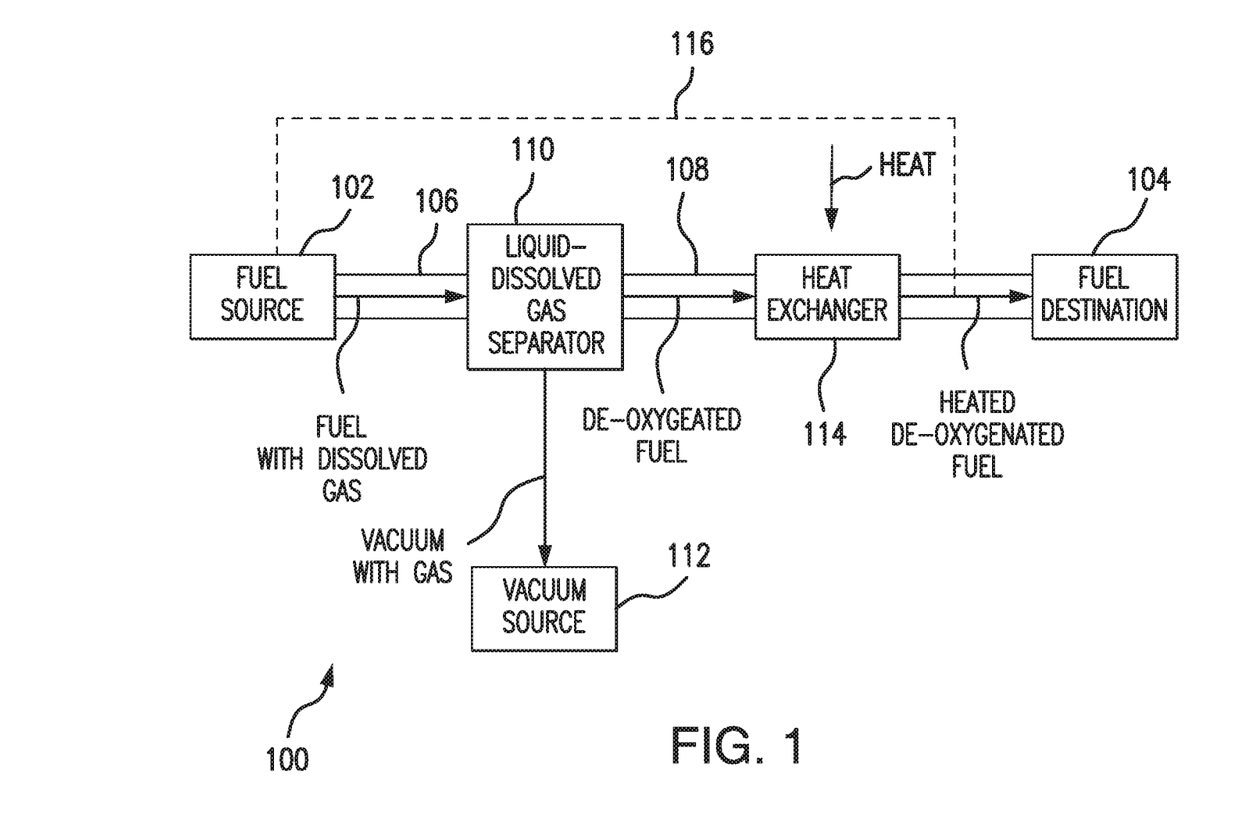
FIG. 1 is a schematic view of an exemplary embodiment of a fuel system constructed in accordance with the present disclosure, showing a liquid-dissolved gas separator fluidly coupling a vacuum source to a fuel flow.

Reference will now be made to the drawings wherein like reference numerals identify similar structural features or aspects of the subject disclosure. For purposes of explanation and illustration, and not limitation, a partial view of an exemplary embodiment of a liquid-dissolved gas separator in accordance with the disclosure is shown in FIG. 1 and is designated generally by reference character 100. Other embodiments of liquid-dissolved gas separators, fuel system liquid-dissolved gas separators, and methods of making liquid-dissolved gas separators in accordance with the disclosure, or aspects thereof, are provided in FIGS. 2-6, as will be described. The systems and methods described herein can be used removing oxygen from liquid fuel, such as in gas turbine engine fuel systems, though present disclosure is not limited to gas turbine engines or to fuel systems in general.

Referring to FIG. 1, an exemplary fuel system, e.g. aircraft fuel system 100. Fuel system 100 includes a fuel source 102, a fuel destination 104, an upstream fuel conduit 106, a downstream fuel conduit 108, and a liquid-dissolved gas separator 110. Fuel source 102 is in fluid communication with fuel destination 104 through liquid-dissolved gas separator 110. A vacuum source 112 is in fluid communication with liquid-dissolved gas separator 110. In the exemplary illustrated embodiment, fuel source 102 is an aircraft fuel tank and fuel destination 104 is a gas turbine engine.

Upstream fuel conduit 106 fluidly couples fuel source 102 with liquid-dissolved gas separator 110 for conveying a fuel F with a dissolved gas G to liquid-dissolved gas separator 110. Downstream fuel conduit 108 fluidly couples liquid-dissolved gas separator 110 with fuel destination 104 for providing a flow of fuel F to fuel destination 104. In certain embodiments gas G includes oxygen and the flow of fuel F to fuel destination 104 is liquid, de-oxygenated fuel. De-oxygenating fuel F enables fuel F to be heated to temperatures approaching (or above) those at which coking could potentially occur, allowing fuel F to be employed for transferring heat from hot engine components like injectors to fuel F. In certain embodiments, a heat exchanger 114 can be interposed fluidly between liquid-dissolved gas separator 110 and fuel destination 104 to transfer heat into fuel F. In accordance with certain embodiments, fuel F can be heated prior to arriving at a combustor of a gas turbine engine, improving the thermodynamic efficiency of the gas turbine engine.

Figure 2:
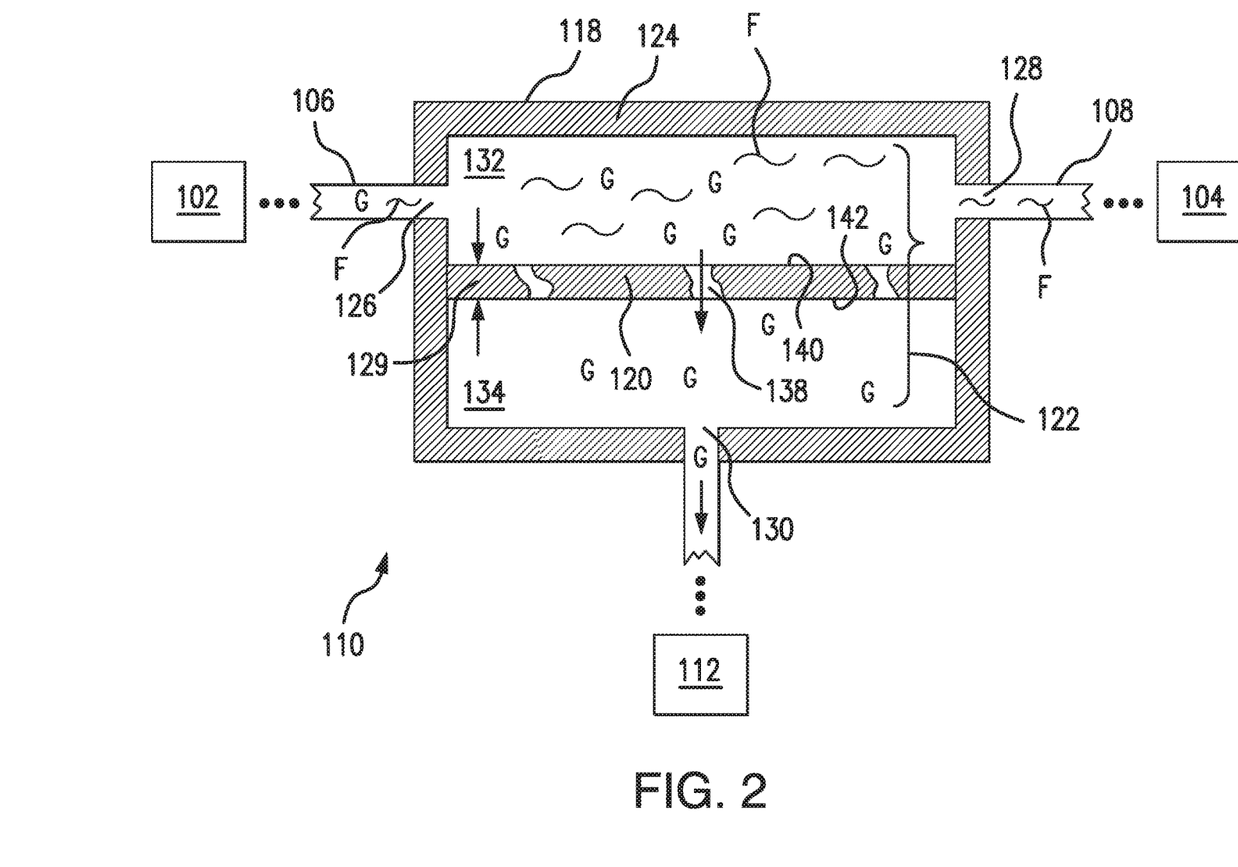
FIG. 2 is a schematic cross-sectional view of the liquid-dissolved gas separator illustrated in FIG. 1, showing the separator dividing the housing interior into a liquid chamber and a vacuum chamber.

With reference to FIG. 2, liquid-dissolved gas separator 110 is shown. Liquid-dissolved gas separator 110 includes a housing 118 and a separator 120. Housing 118 has an interior 122 that is bounded by a housing wall 124. A fuel inlet port 126 define within housing wall 124 places upstream fuel conduit 106 in fluid communication with interior 122. A fuel outlet port 128 places interior 122 in fluid communication with downstream fuel conduit 108. A vacuum port 130 places vacuum source 112 in fluid communication with interior 122.

Separator 120 is seated within housing interior 122 and is sealed about its periphery with an interior surface of housing wall 124, housing 118 enveloping separator 120. Separator 120 divides interior 122 into a liquid chamber 132 and a vacuum chamber 134. Fuel inlet port 126 is in fluid communication with fuel outlet port 128 through liquid chamber 132, and is in selective fluid communication with vacuum port 130 through separator 120. Vacuum port 130 is in fluid communication with vacuum chamber 134, and is in fluid communication with liquid chamber 132 through separator 120.

Separator 120 has a plurality of open pores 138. The open pores 138 connect a liquid-facing surface 140 of separator 120 with an opposed vacuum-facing surface 142 of separator 120 for separating dissolved gases, e.g., dissolved gas G, from a liquid flow, e.g., fuel F, traversing liquid-facing surface 140 of separator 120.

Open pores 138 are surface-connected with liquid-facing surface 140. Open pores 138 are also surface-connected with vacuum-facing surface 142. Open pores 138 extend continuously through a thickness 129 of separator 120, thereby placing liquid chamber 116 in fluid communication with vacuum chamber 134. In certain embodiments separator 120 may be a membrane body, i.e., be extremely thin in relation to surface area defined by the structure. It is contemplated that thickness 129 of separator 120 may be on the order of about 40 microns (about 0.002 inches). Thicknesses on the order of about 40 microns provide suitable porosity in additively manufactured sheet-like structures for separating dissolved oxygen from liquid fuel while providing suitable strength to resist forces exerted on such structure by the vacuum required to pull dissolved oxygen through the structure.

Open pores 138 define an irregular passage extending through thickness 129 between liquid-facing surface 140 and vacuum-facing surface 142. For example, one or more of open pores 138 may define a non-linear passage extending through thickness 129 between liquid-facing surface 140 and vacuum-facing surface 142. One or more of open pores 138 may define a meandering passage extending through thickness 129 between liquid-facing surface 140 and vacuum-facing surface 142, the passage having a length greater than thickness 129.

It is contemplated that respective flow areas defined by open pores 138 can vary in width along the passage length. It is also contemplated each of open pores 138 define a critical dimension 144 (shown in FIG. 3) along its length between liquid-facing surface 140 and vacuum-facing surface 142 that determines the maximum size molecule that can pass through the open pore, critical dimension 144 thereby limiting fluid communication between liquid chamber 116 and vacuum chamber 134 according to the dynamic size of molecules disposed within liquid chamber 116. In certain embodiments, critical dimension 144 is sized to be smaller than sizes of liquid molecules disposed within liquid chamber 132 but greater the size of gas molecules dissolved within the liquid, differential pressure across separator 120 thereby causing gas molecules to pass through open pores 138 while liquid fuel remains within in liquid chamber 132.

Figure 3:
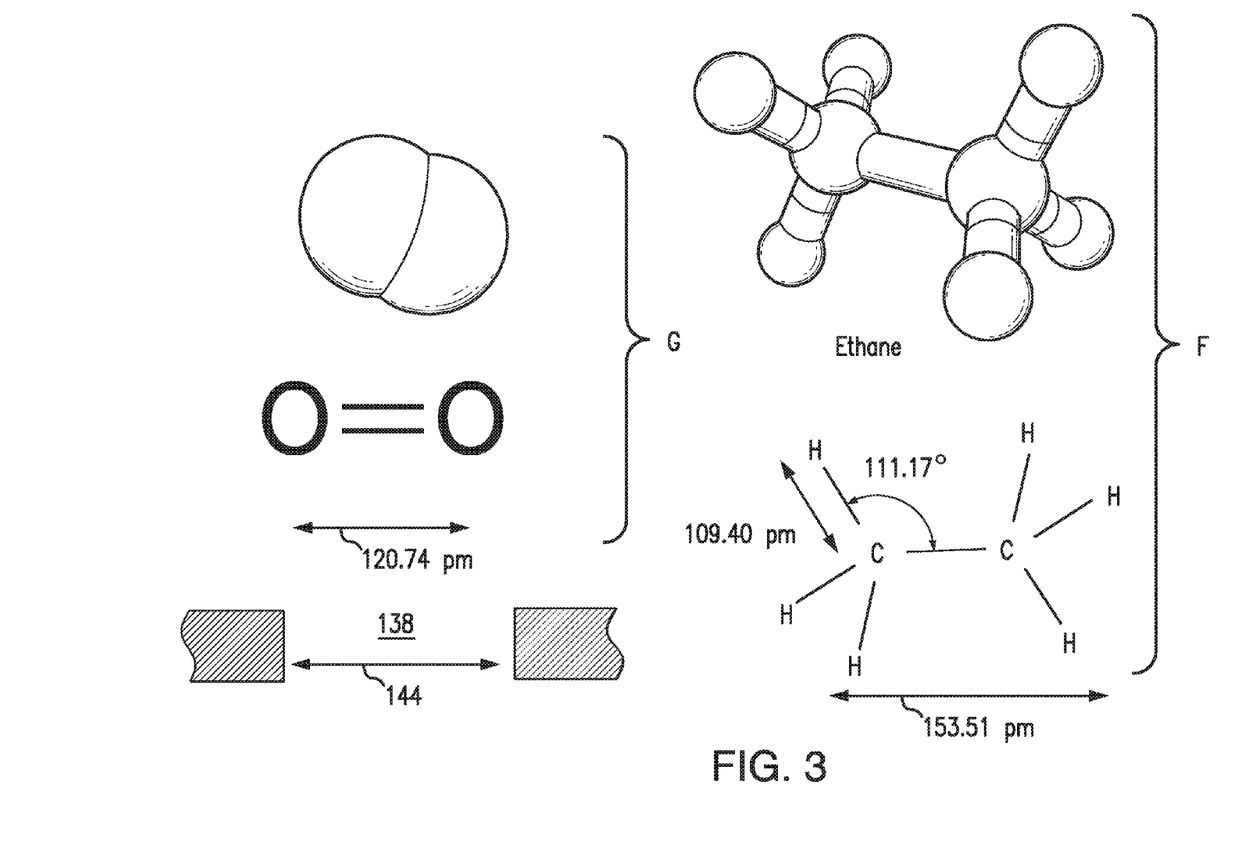
FIG. 3 is diagram of a liquid with a gas dissolved in the liquid within the liquid-dissolved gas separator of FIG. 1, showing molecular diameters of liquid and gas molecules in relation to an open pore critical dimension of the separator.

With reference to FIG. 3, an exemplary open pore 138 is shown in relative to exemplary gas molecule G and liquid molecule F. Open pore 138 defines a critical dimension 144. Critical dimension 144 is larger than gas molecule G, e.g., oxygen, and is smaller than liquid molecule F, e.g., ethane. Since critical dimension 144 is greater than the size of gas molecule G and is smaller than the size of liquid molecule F, gas molecule G can pass through open pore 138 while liquid molecule F cannot.

In certain embodiments, critical dimension 144 is sized to be smaller than about 250 picometers (about 1.2 e-8 inches). Since liquid fuel molecules like ethane are larger than 250 picometers, sizing critical dimension 144 to be less than about 250 picometers prevents ethane from passing through open pores 138. Since oxygen molecules are smaller than 250 picometers, sizing critical dimension to be less than about 250 picometers allows oxygen dissolved within liquid ethane to pass through open pores 138.

In accordance with certain embodiments, critical dimension 144 is sized to be greater than 150 picometers (about 0.6 e-8 inches). Since oxygen molecules are larger than about 150 picometers, sizing critical dimension 144 to be greater than about 150 picometers enables each open pore so sized to allow oxygen to pass through the respective open pore, maximizing the amount of dissolved oxygen passing through open pores 138 for a given pressure differential across separator 120 (shown in FIG. 2). Maximizing the amount of dissolved oxygen that can pass through open pores 138 for a given pressure differential reduces the surface area that separator 120 need present to liquid F to remove a given amount of dissolve gas G, reducing the size of liquid-dissolved gas separator 110 (shown in FIG. 1). Reducing the surface area than separator 120 need present to liquid F to remove a given amount of dissolve gas G can also simplify the construction of separator 120, for example, by allowing separator 120 to be self-supporting.

Figure 4:
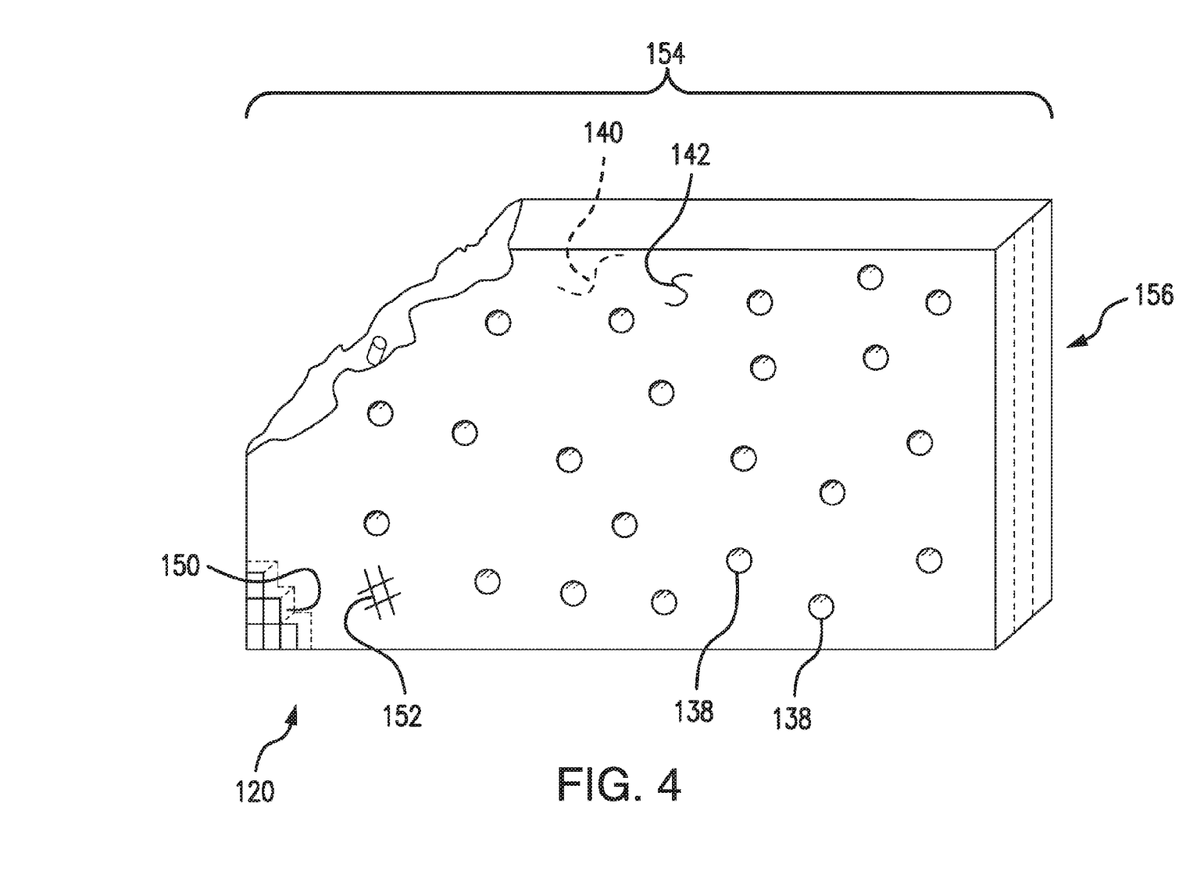
FIG. 4 is a partial cross-sectional view of the separator illustrated in FIG. 1, showing porosity and construction of the separator.

With reference to FIG. 4, separator 120 is shown. As will be appreciated by those of skill in the art in view of the present disclosure, vacuum source 112 (shown in FIG. 1) pulls a negative pressure against vacuum-facing surface 142 of separator 120. The negative pressure, as well as liquid pressure from liquid disposed within liquid chamber 132 (shown in FIG. 2), exerts force on separator 120 which separator 120 must resist in order to maintain sealing, prevent rupture, and retain mechanical integrity during service. In order to resist this force, separator 120 includes a monolithic body formed from one or more layers 156 of interfused particles 150.

Interfused particles 150 bound vacuum-facing surface 142, bound liquid-facing surface 140, and include a metallic material 152. Metallic material 152 may include, by way of non-limiting example, aluminum, titanium, steel, and/or a nickel-based alloy. It is contemplated that interfused particles 150 be interfused using an additive manufacturing technique, such as a powder bed fusion or laser sintering technique. Fusing particles 150, e.g., particles including metallic material 152, provides separator 120 with mechanical strength sufficient resist force exerted on separator 120 when employed in liquid-dissolved gas separator 110 (shown in FIG. 1). In certain embodiments interfused particles provide separator 120 with mechanical strength sufficient to resist force exerted on separator 120 during operation without the need for a support structure. Instead, separator 120 is self-supporting and is tear-resistant in comparison to materials such as Teflon®.

Fusing particles 150 also provides separator 120 with porosity 154. In this respect the additive manufacturing process used to fuse particles 150 impart a natural level of porosity 154 to separator 120. The porosity 154 imparted to separator 120 by the additive manufacturing process provide a relatively uniform distribution of open pores 138 (shown in FIG. 2) within separator 120, i.e., between opposed lateral and longitudinal edges of separator 120. In certain embodiments fabricate separator 120 provides porosity 154 that is between about 0.1 and about 0.3, as suitable for an intended application.

As will be appreciated by those of skill in the art in view of the present disclosure, the additive manufacturing technique used to fabricate separator 120 imparts a distribution of open pore critical dimension sizing to separator 120. Since the open pore critical dimension sizing is characteristic of the additive manufacturing technique used to fabricate separator 120, critical dimension 144 can be selected by accepting the natural porosity of the additive manufacturing technique used to fabricate separator 120.

In certain embodiments, critical dimension 144 can be sized by tuning process variables of the additive manufacturing technique used to fabricate separator 120, such as material selection, fusing speed, layer thickness, energy input, etc. In accordance with certain embodiments, critical dimension 144 can be sized by subsequent processing of separator 120, such as be application of heat and/or pressure in a hot isostatic pressing process subsequent to fusing particles 150. It is contemplated that at least one of these techniques be selected such that separator 120 have open pores 138 with critical dimensions 144 within a size distribution where most (if not all) open pores 138 have critical dimensions 144 smaller than liquid fuel molecules F (shown in FIG. 3), and most (if not all) open pores 138 have critical dimensions larger than oxygen molecules G (shown in FIG. 3).

Figure 5:
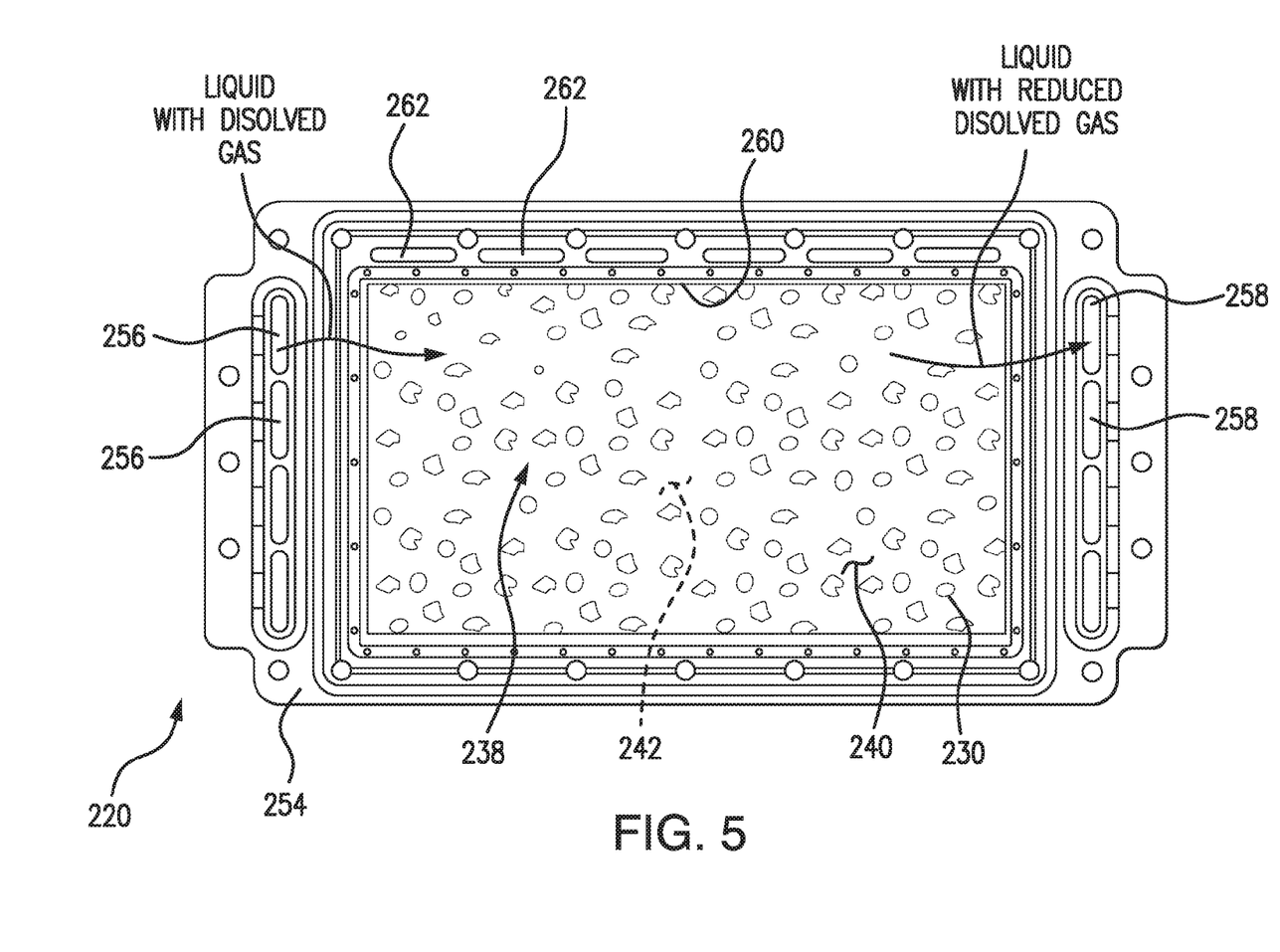
FIG. 5 is a plan view of another embodiment of the separator shown in FIG. 1, showing a separator with frame extending about a periphery of the separator.

With reference to FIG. 5, a separator 220 is shown. Separator 220 is similar to separator 120 (shown in FIG. 2) and additionally includes a frame 254. Frame 254 extends about a periphery 260 of separator 220 and surrounds open pores 238 defined within separator 220. Frame 254 is integral with separator 220, i.e. is not removable, is formed from the same metallic material as separator 220, and is formed coincident with separator 220 during a common additive manufacturing operation.

Liquid inlet ports 256 and liquid outlet ports 258 are disposed on laterally (relative to the drawing figures) opposite sides of frame 254 for flowing fuel across a liquid-facing surface 240 of separator 220, thereby exposing liquid traversing liquid-facing surface 240 to vacuum applied to an opposed vacuum-facing surface 242 of separator 220. A plurality of vacuum ports 262 are disposed along an upper (relative to the drawing sheet) edge of frame 254 for fluid connecting vacuum-facing surface 242 with a vacuum source, e.g., vacuum source 112 (shown in FIG. 1).

As will be appreciated by those of skill in the art in view to the present disclosure, arranging liquid inlet ports 256 and liquid outlet ports 258 on peripherally opposite sides of frame 254 allows for stacking multiple passes across liquid-facing surface 240 of separator 220, thereby providing sufficient liquid to separator contact time to remove a desired amount of dissolved gas from the liquid. As will also be appreciated by those of skill in the art in view of the present disclosure, arranging vacuum ports 260 across a peripheral edge of frame 254 enables ganging the ports to a common vacuum source for transporting removed gas out of a liquid-dissolved gas separator employing separator 220.

Figure 6:
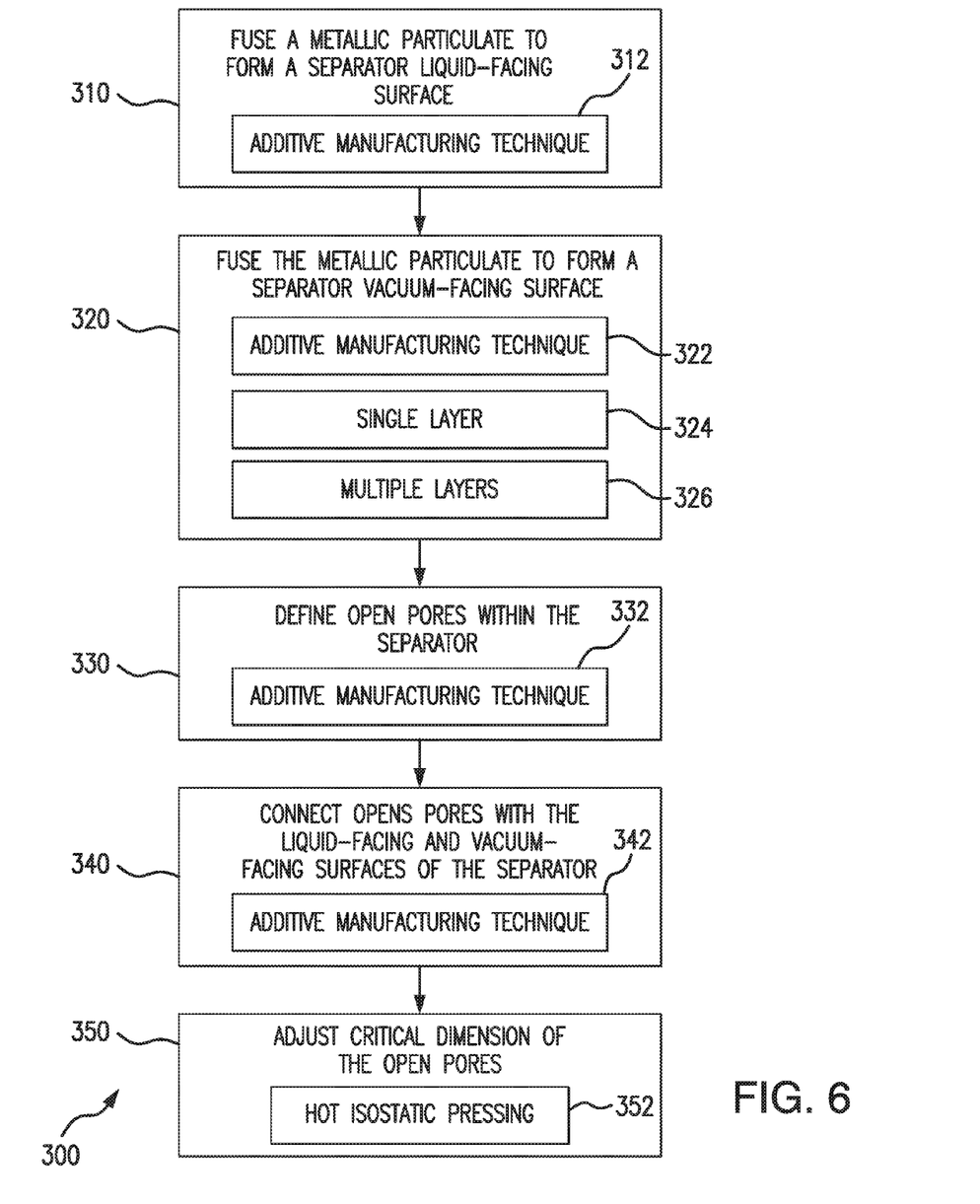
FIG. 6 is a block diagram of a method of making a separator for a liquid-dissolved gas apparatus, showing steps for making the separator using an additive manufacturing technique.

With reference to FIG. 6, a method 300 of making a separator, e.g., separator 120 (shown in FIG. 2) or separator 220 (shown in FIG. 5) for a liquid-dissolved gas separator, e.g., liquid-dissolved gas separator 110 (shown in FIG. 1) is shown. Method 300 includes fusing metallic particulate, e.g., interfused particles 150 (shown in FIG. 4) to form a separator liquid-facing surface, e.g. liquid-facing surface 140 (shown in FIG. 2), as shown with box 310. The liquid-facing surface can be formed by interfusing metallic particulate using an additive manufacturing technique, such as a powder bed fusion or laser sintering technique, as shown with box 312.

Method 300 also includes fusing the metallic particulate to define a separator vacuum-facing surface, e.g., vacuum-facing surface 142 (shown in FIG. 2), as shown with box 320. Defining the separator vacuum-facing surface can include using the additive manufacturing technique, such as the powder bed fusion or laser sintering technique, as shown with box 322. In certain embodiments, the liquid-facing surface and the vacuum-facing surfaces of the separator can be formed at the same time, such as by fusing a single layer of metallic particulate where opposite sides of the fused metallic particulate form the liquid-facing and vacuum-facing surfaces of the separator, as shown with box 324.

In accordance with certain embodiments, the liquid-facing surface and the vacuum-facing surfaces of the separator can be formed at different times by fusing more than one layer of particulate to form the separator, as shown with box 326. It is also contemplated that a frame, e.g., frame 254 (shown in FIG. 5), can be integrally formed about the separator using the additive manufacturing technique, simplifying incorporation of the separator into a housing, e.g., housing 118 (shown in FIG. 2).

Method 300 additionally includes defining open pores, e.g., open pores 138 (shown in FIG. 3), within the separator, as shown with box 330. Defining the separator vacuum-facing surface can include using the additive manufacturing technique, such as the powder bed fusion or laser sintering technique, as shown with box 332. The open pores may be defined coincidentally with forming the separator using the additive manufacturing technique.

Method 300 further includes surface-connecting the open pores with the liquid-facing surface and the vacuum-facing surface such that the open pore fluidly connects the liquid-facing surface with the vacuum-facing surface through the open pore, as shown with box 340. Defining the separator vacuum-facing surface can include using the additive manufacturing technique, such as the powder bed fusion or laser sintering technique, as shown with box 342. Surface-connecting the open pores with the liquid-facing and vacuum-facing surfaces can be coincident with forming the separator using the additive manufacturing technique.

Optionally, method 300 can include adjusting a critical dimensions, e.g., critical dimension 144, of open pores defined within (and through) the separator, as shown with box 350. The critical dimensions can be adjusted such that critical dimensions of the open pores are smaller than the dynamic size of liquid molecules from which dissolved gas is to be removed, e.g., fuel F (shown in FIG. 3). The critical dimensions can be adjusted such critical dimensions of the open pores are greater than the dynamic size of a gas, e.g., gas G (shown in FIG. 3), dissolved within the liquid. The critical dimensions can be adjusted such that the critical dimensions are both smaller than the dynamic size of liquid molecules from which dissolved gas molecules are to be removed and greater that the dynamic size of the dissolved gas molecules within the liquid.

Adjusting the open pre critical dimension can be done, for example, by applying heat and pressure to the separator using a hot isostatic pressing (HIP) operation to reduce open pore minimum flow area and/or flow area shape, as shown with box 352. Use of a HIP operation enables matching the porosity of an additively manufactured article characteristic of the additive manufacturing technique with the open pore critical dimension necessary to allow the article to function as liquid-dissolved gas separator, such as for a fuel de-oxygenator device for an aircraft fuel system.

High temperature fuel systems can exhibit coke formation above certain temperatures, for example in arrangements where fuel temperature can reach about 120 degrees Celsius (about 250 degrees Fahrenheit). De-oxygenating fuel traversing such fuel systems can preclude coke formation until temperatures reach about 315 degrees Celsius (about 600 degrees Fahrenheit). While Teflon® or similar materials can be employed under low pressure conditions to de-oxygenate fuel, structures formed of such materials can be difficult to secure within the fuel system, may be delicate, prone to leakage, difficult to manufacture, and/or rupture in the event of over pressurization.

In certain embodiments described herein, additive manufacturing techniques are employed to produce a metallic separator with porosity that is selective at the molecular level. It is contemplated that the metallic separator be formed as a thin, sheet-like (or membrane-like) metallic structure such that molecules with small kinetic diameters, e.g., oxygen, may pass through the metallic separator while molecules with larger kinetic diameters are prevented from passing through the separator. It is also contemplated that the separator have uniform (or homogenous) porosity and associated uniform porosity characteristics.

The methods and systems of the present disclosure, as described above and shown in the drawings, provide for liquid-dissolved gas separators with superior properties including self-supporting structures with selectivity at the molecular level. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A liquid-dissolved gas separator, comprising:
    a housing; and
    a metallic separator mounted within the housing having open pores connecting a liquid-facing surface and an opposed vacuum-facing surface of the separator, the separator being configured to allow selected gases dissolve in a liquid traversing the housing and adjacent the liquid-facing surface to pass through the plurality of open pores,
    wherein the open pores have critical dimensions that are smaller than about 250 picometers (about 1.2 e-8 inches).

2. The separator as recited in claim 1, wherein the separator includes interfused metallic particles, wherein the interfused metallic particles define both the liquid-facing surface and the vacuum-facing surface of the separator.

3. The separator as recited in claim 1, wherein the separator comprises one or more of a nickel-based alloy, steel, titanium, aluminum, or an alloy thereof.

4. The separator as recited in claim 1, wherein the open pores are surface-connected with both the liquid-facing surface and the vacuum-facing surface of the separator.

5. The separator as recited in claim 1, wherein the open pores have critical dimensions that are greater than about 150 picometers (about 0.6 e-8 inches).

6. The separator as recited in claim 1, wherein the separator has a porosity that is between about 0.1 and about 0.3.

7. The separator as recited in claim 1, wherein the separator includes a first lateral edge and an opposed second lateral edge, the plurality of open pores being uniformly distributed between the first and second lateral edges of the separator.

8. The separator as recited in claim 1, wherein the separator includes a first longitudinal edge and an opposed second longitudinal edge, the plurality of open pores being uniformly distributed between the first and second longitudinal edges of the separators.

9. The separator as recited in claim 1, further comprising a vacuum source in fluid communication with the liquid-facing surface of the separator through the plurality of open pores.

10. The separator as recited in claim 1, further comprising a liquid source in fluid communication with the vacuum-facing surface through the open pores.

11. The separator as recited in claim 1, further comprising a liquid destination in fluid communication with the vacuum-facing surface through the open pores.

12. The separator as recited in claim 1, wherein the housing envelopes the separator and divides an interior of the housing into a liquid chamber and a gas chamber.

13. The separator as recited in claim 12, further comprising a frame extending about a periphery of the separator, wherein the separator and the frame are formed from a common metallic material.

14. The separator as recited in claim 1, wherein the liquid-facing surface and the vacuum-facing surface are each planar surfaces.

15. A fuel system, comprising:
a fuel de-oxygenator, including:
a housing with an interior; and
a separator as recited in claim 1 seated within the housing interior, wherein the separator divides the housing into a liquid chamber and a gas chamber;
a vacuum source in fluid communication with the liquid-facing surface of the separator through the open pores;
a fuel source in fluid communication with the vacuum-facing surface through the open pores; and
a fuel destination in fluid communication with the vacuum-facing surface through the open pores,
wherein the open pores have respective critical dimensions that are and greater than about 150 picometers (about 0.6 e-8 inches) to separate dissolved oxygen from fuel flowing between the fuel source and the fuel destination as the fuel traverses the liquid-facing surface of the separator.

16. The fuel system as recited in claim 15, wherein the separator comprises one or more of a nickel-based alloy, steel, titanium, aluminum, or an alloy thereof.

17. The fuel system as recited in claim 15, wherein the separator includes interfused metallic particles, wherein the interfused metallic particles define both the liquid-facing surface and the vacuum-facing surface of the separator.

18. The fuel system as recited in claim 15, wherein the open pore is surface-connected with both the liquid-facing surface and the vacuum-facing surface of the separator.

19. A method of making a separator for a liquid-dissolved gas separator, comprising:
fusing metallic particulate to define a separator liquid-facing surface;
fusing particulate to define a separator vacuum-facing surface;
defining a plurality of open pores within the separator; and
connecting the open pores with the liquid-facing surface and the vacuum-facing surface of the separator,
wherein fusing metallic particulate to define a separator liquid-facing surface includes fusing the metallic particulate using an additive manufacturing technique,
wherein fusing metallic particulate to define a separator vacuum liquid-facing surface includes fusing the metallic particulate using an additive manufacturing technique, and
wherein defining a plurality of open pores within the separator includes imparting a natural level of porosity into the separator such that plurality of the open pores have critical dimensions that are smaller than about 250 picometers (about 1.2 e-8 inches).

* * * * *